United States Patent

[11] 3,602,591

[72] Inventors Adrianus Gerardus Bouwer; Marinus Reinerus Joannes DeBont; Frits Theodoor Klostermann, all of Emmasingel, Eindhoven, Netherlands
[21] Appl. No. 796,513
[22] Filed Feb. 4, 1969
[45] Patented Aug. 31, 1971
[73] Assignee U. S. Philips Corporation New York, N.Y.
[32] Priority Feb. 10, 1968
[33] Netherlands
[31] 6801924

[54] STEP AND REPEAT CAMERA
4 Claims, 4 Drawing Figs.

[52] U.S. Cl. .......... 355/53, 355/54, 355/95, 355/133, 95/1, 95/12
[51] Int. Cl. .......... G03b 27/42
[50] Field of Search .......... 355/53, 40, 95, 55, 61, 62, 63, 75, 44, 45; 95/73, 12

[56] References Cited

UNITED STATES PATENTS

| | | | |
|---|---|---|---|
| 2,866,397 | 12/1958 | Gillette | 355/40 |
| 3,192,844 | 7/1965 | Szasz et al. | 95/73 |
| 3,334,541 | 8/1967 | Delp | 95/12 |
| 3,399,593 | 9/1968 | Delp | 355/53 |
| 3,449,049 | 6/1969 | Harding et al. | 355/53 |

*Primary Examiner*—Samuel S. Matthews
*Assistant Examiner*—D. J. Clement
*Attorney*—Frank R. Trifari

ABSTRACT: A step and repeat camera for reducing and reproducing in a repeating manner an object having the pattern to be reproduced on a plurality of photographic plates. The plates are supported on a table slidably mounted on a base and a housing having projection means is slidably mounted above the table. A plurality of apertures is provided in the surface of the housing and a means for accurately orienting and aligning the object over the aperture is movably arranged above the surface of the housing. The object is provided with an aligning mark which is intended to coincide with an aligning mark adjacent each of the apertures. The aligning means comprises a device for moving the object over the surface of the table until the aligning marks are aligned and a microscope is provided for movement with the aligning means for accurate observation to determine when the marks are aligned.

INVENTORS
ADRIANUS G. BOUWER
BY MARIUS R.J. DEBONT
FRITS T. KLOSTERMANN
Frank R. Trifari
AGENT

INVENTORS
BY ADRIANUS G. BOUWER
MARINUS R.J. DE BONT
FRITS T. KLOSTERMANN
AGENT

INVENTORS
ADRIANUS G. BOUWER
MARINUS R.J. DE BONT
FRITS T. KLOSTERMANN
BY [signature] AGENT INVENTORS
ADRIANUS G. BOUWER
BY MARINUS R.J. DE BONT
FRITS T. KLOSTERMANN
Frank R. Trifari
AGENT

STEP AND REPEAT CAMERA

The invention relates to a step and repeat camera which, uses optical reduction, reproduces in a repeating manner at least one photographically obtained object of a desired pattern on at least one plate of photographic material having a high resolving power. The camera includes a device for aligning the object relative to the directions of coordinates of slide guides, one of which supports the plate or plates of photographic material. Successively different areas of said plate or plates are exposed and the camera has a surface for supporting the object with a desired pattern.

The manufacture of integrated electronic circuits has become possible by using photolithographic techniques. For this purpose so-called photomasks are required. A photomask is a microphotographic negative or positive which has a large number of arrayed identical patterns, which has to have a high degree of contrast and great definition. Such a photomask is used for geometrically bounding of the patterns which must be provided in a thin layer of photoresist which is provided on a wafer of semiconducting material (for example, silicon). As a rule, the photoresist is exposed while in contact with the photomask, the unexposed or the exposed parts of the photoresist being soluble dependent on the use of a negative or a positive resist. After exposure the soluble parts are removed by development. The undissolved photoresist remaining on the wafer acts as a selective mask resisting the action of chemicals used in the manufacture of integrated circuits. A number of successive masking steps and thus a number of photomasks are required to obtain the ultimate integrated circuit. The geometry of the patterns in such a number of photomasks is different, the patterns of each subsequent photomask must of course accurately register with the patterns provided on the wafer manner the previous masking operation.

In the manufacture of a photomask one usually proceeds as follows. First a master copy is made of the single pattern on a highly enlarged scale (for example, 200 times). Subsequently this master copy is reduced with the aid of a special first reduction camera (for example. 20 times) on a photographic plate. This reduced pattern is then placed as an object in a step and repeat camera and is repeated in a reduced form (for example, 10 times) on a plate of photographic material having a resolving power which exceeds 500 lines per mm. The developed plate may then have, for example, 20 rows each of 20 single patterns. Currently step and repeat cameras are often used having 4 or 6 projecting systems, it is thus possible to simultaneously manufacture 4 or 6 photomasks possibly belonging to one set (See for example T. G. Maple, "Integrated circuit mask fabrication S.C.P. and Solid State Technology," Aug. 1966, 23—34).

It will be apparent that the objects to be reduced and repeated with the aid of a single or multiple step and repeat camera, have to be accurately aligned linearly and angularly. In a known step and repeat camera the object is aligned with respect to a metal frame in a separate alignment device with the aid of a micromanipulator and a crossbar microscope. The objects are subsequently stuck to the metal frame. The position of the metal frame is adopted in the step and repeat camera with the aid of stop pins. The frames required for this purpose are expensive. In addition, securing the object to the frame is time-consuming and detrimental to the accuracy. Exact positioning with the aid of the stop pins may also easily be disturbed by dust particles.

In a further known step and repeat camera in which the alignment is effected on the camera, the object is observed through the objective lens for the optical reduction by means of a crossbar microscope which is rigidly coupled to the housing of the step and repeat camera. A drawback to this system is that the angular alignment cannot be effected with sufficient accuracy.

An object of the invention is to provide a step and repeat camera in which the object of a desired pattern is aligned in a very accurate and rapid manner with the aid of means which have to satisfy only simple requirements. According to the invention, to achieve this object, the supporting surface of the step and repeat camera is provided with at least one aligning mark in a material sense, which correlates with the aligning mark on each object, while a micromanipulator and a microscope coupled thereto can be positioned above each aligning area for causing the aligning marks in the object and the supporting surface to coincide.

The aligning mark in a material sense may, for example, have the shape of a cross which is provided with the aid of a photolithographic technique on, for example, a glass plate which is secured to the supporting surface. Since the aligning mark can be provided in the supporting surface of the object with very great accuracy relative to the directions of movement of the slides and relative to each other in the case of a multiple step and repeat camera, an extremely accurate alignment is possible. The marks need only be provided once, the mark (the marks) is (are) permanently present in the supporting surface.

It will be apparent that the correlating marks in the object and the supporting surface can now be aligned relative to each other in a simple and quick manner. No particular requirements need be imposed on both the microscope and the micromanipulator. The microscope need not have crossbars or other aligning marks to be provided accurately, and neither need it be placed in an extremely accurate position over the aligning marks. It should only have such a quality that the aligning marks in the object and supporting surface located at a very small distance one over the other can be observed with sufficient definition. The micromanipulator may also be of a simple type by which the object can be displaced with sufficient accuracy, both in two directions of coordinate and angularly. The speed of operation is enchanced because the microscope and the micromanipulator are connected together so that they can always be simultaneously positioned over the aligning area. Since this positioning in the step and repeat camera according to the invention is not critical, only slight requirements are to be imposed on the means to obtain this positioning such as a slide guiding. The accuracy of alignment is not detrimentally influenced thereby. The microscope may have a single objective lens which can be moved above two locations of the aligning mark, for example, with the aid of a slide guiding. In a preferred embodiment according to the invention the microscope is, however provided with two objective lenses placed side-by-side for simultaneous observation of two locations of the aligning marks during alignment. Since the microscope has two juxtaposed objective lenses two spaced locations of the aligning marks are observed simultaneously. For this reason also a very quick alignment is possible, it being also possible to carry out angular alignment, which is very important, with very great accuracy.

In a further embodiment of the step and repeat camera according to the invention a guide is secured to one side of the housing of the step and repeat camera and guiding block can be displaced on the guide in a direction parallel to the supporting surface. Another guiding body is connected to the guiding block to pivot about an axis which is parallel to the direction of displacement, a supporting arm being movably connected to said guiding body and the direction of displacement of which extends transversely to the direction of displacement of the guiding block. The microscope and the micromanipulator are rigidly secured to said supporting arm. The microscope and micromanipulator connected together can be positioned in a quick and simple manner at any desired area above the supporting surface of the step and repeat camera with the aid of the guides positioned transversely to each other. The microscope and the micromanipulator can be swiveled to the side of the step and repeat camera with the aid of the pivotal connection so that an exposure head may be provided above the supporting surface.

In order that the invention may be readily carried into effect it will now be described in detail, by way of example, with reference to the accompanying diagrammatic drawings, in which.

Figure 1:
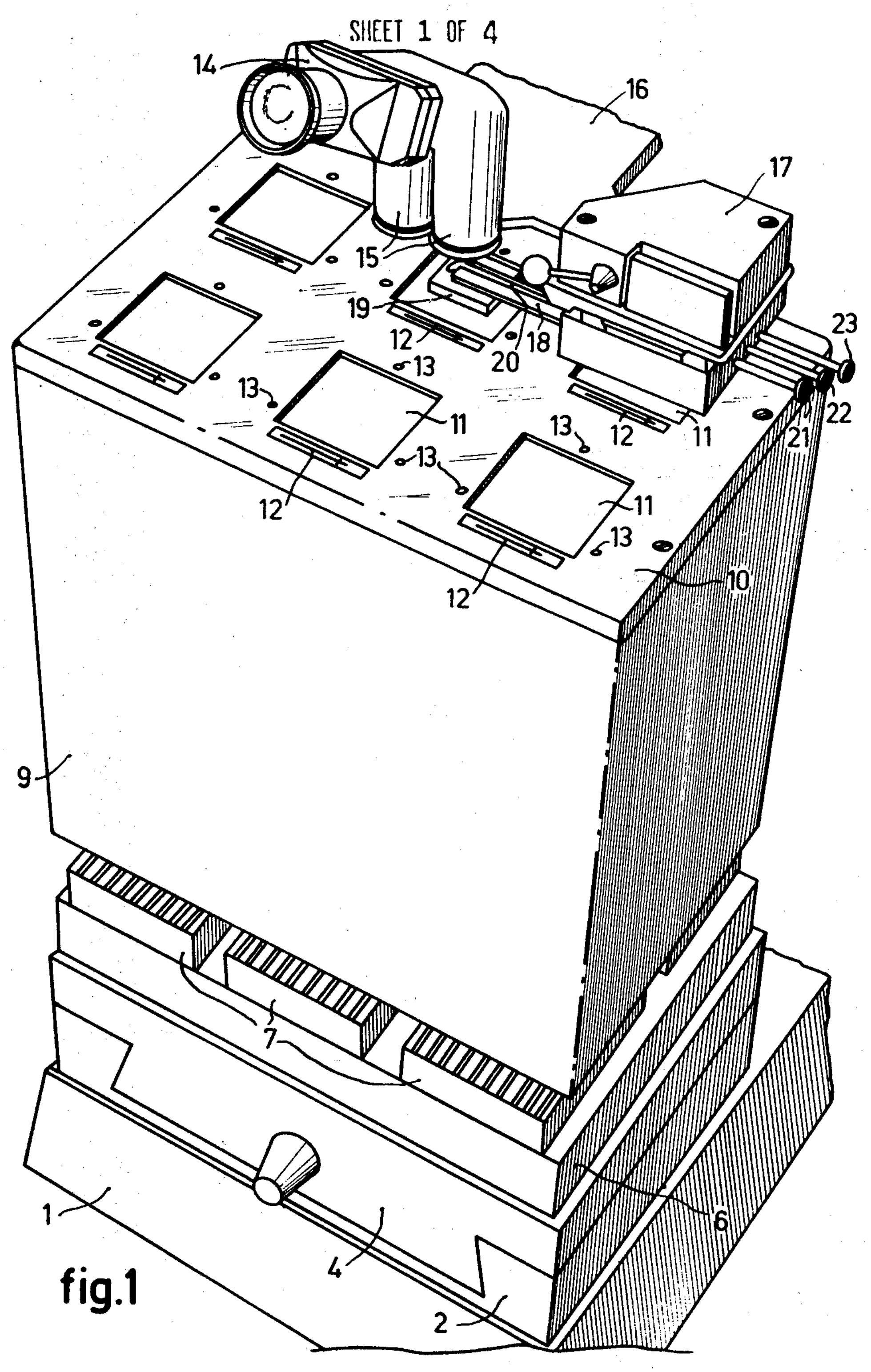
FIG. 1 is a perspective elevational view of part of the step and repeat camera.
Figure 2:
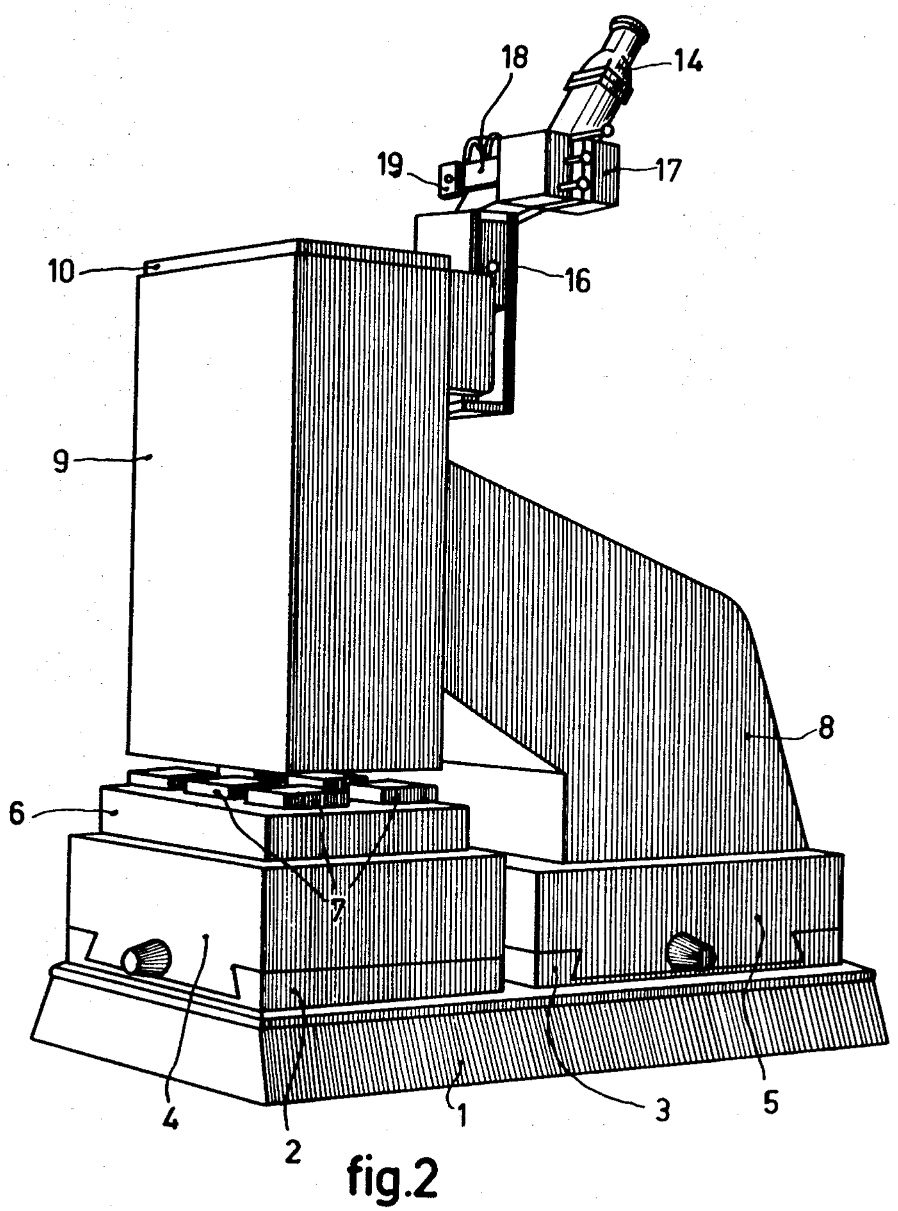
FIG. 2 is a perspective elevational view on a smaller scale.
Figure 3:
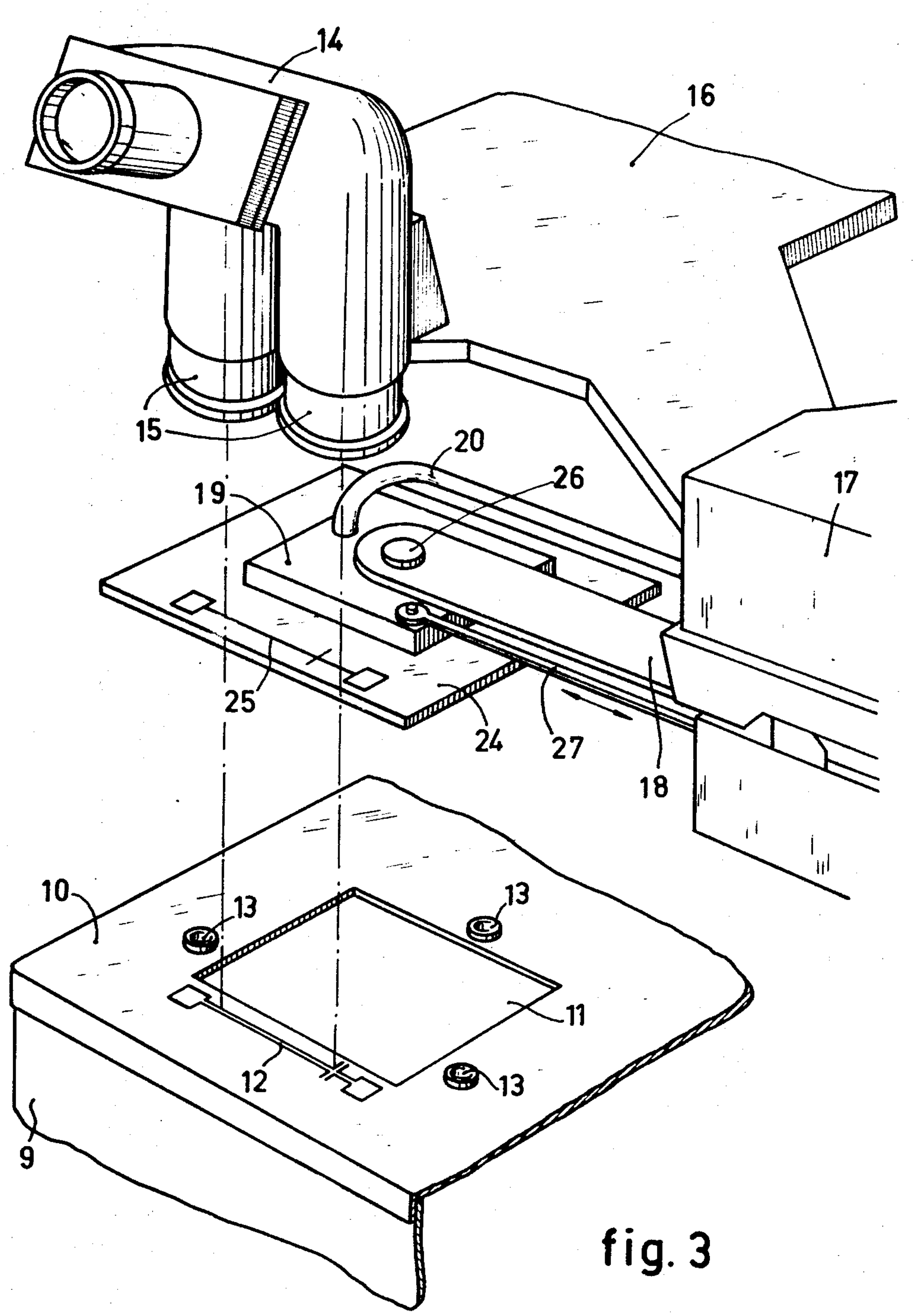
FIG. 3 is a perspective view of the positioning means, the parts being shown at a distance from one another for the sake of clarity.

FIGS. 1 and 3 show a six-fold step and repeat camera. Two slide guides 2 and 3 are secured to a base 1. A slide 4 is movable in the guide 2, while a slide 5 is arranged to move in guide 3. The directions of movement of the slides 4 and 5 are at right angles in the embodiment shown. A table 6 carrying six supports 7 is provided on slide 4. A plate of photographic material not shown is placed on each support. Any suitable material can be used for this purpose provided the resolving power is higher than 500 lines per mm. After exposure these plates act as photomasks in the manufacture of integrated circuits. A support 8 (see FIG. 2) is secured to slide 5, which support carries a housing 9 including six projection lenses not shown. These projection lenses give a reduced image of a pattern in an object on the plates of photographic material which object can be placed on a supporting surface 10 of the housing 9.

Six apertures 11 located above the supports 7 are provided in supporting surface 10. One of the said projection lenses is provided between each aperture 11 and each support 7. An aligning mark 12 is provided on one side of the apertures 11 in the supporting surface 10. The aligning mark may, for example, be applied with the aid of a photolithographic technique on a glass plate which is secured to the supporting surface. Furthermore, a number of ducts 13 terminate at each aperture 11, in which ducts a pressure lower than atmospheric pressure can be produced. If an object is placed above aperture 11, it can be sucked against the supporting surface 10 with the aid of the slightly lower than atmospheric pressure in the ducts 13.

FIG. 1 shows a microscope 14 having two lenses 15 arranged over one of the aligning marks 12 in the supporting surface 10. The microscope is secured to a supporting arm 16 to which also a micromanipulator 17 is secured. The micromanipulator has an arm 18 which carries a holder 19 at its end. Ducts which communicate through a flexible conduit 20 with a source of pressure lower than atmospheric pressure are provided on the lower side of holder 19. An accurate displacement of holder 19 can be obtained in the directions of movement of the two slides 4 and 5 with the aid of knobs 21 and 22 on the manipulator. Holder 19 can be turned with the aid of knob 23 for obtaining a desired angular adjustment. In FIG. 2 the supporting arm 16 and the manipulator and microscope connected thereto are swiveled aside from housing 9. In this position an exposure head not shown may be placed on the housing 9.

FIG. 3 is an exploded view of the aligning means. The aligning mark 12 is permanently provided in supporting surface 10. An object 24, for example, a photographic plate has a pattern which must be reproduced in a repeating and reduced manner on a plate of photographic material provided on support 7. When applying the pattern the object 24 is also provided with an aligning mark 25 which correlates with aligning mark 12 on supporting surface 10. The object 24 is placed on supporting surface 10 such that the aligning marks 12 and 25 reasonably coincide, the object being held on the supporting surface with the aid of a slight pressure lower than atmospheric pressure in the ducts 13. Subsequently the micromanipulator 17 and the microscope 14 are arranged above the object. The microscope is adjusted in such a manner that the field of view of one of the lenses is located at the crossing in mark 12 and the field of view of the other lens is located approximately at the end of the long part of the cross. Conduit 20 is now connected to the source of pressure lower than atmospheric pressure so that the object 24 is sucked tightly against holder 19. Due to adjusting the knobs 21–23 (see FIG. 1) of the micromanipulator 17 the object 24 is now aligned in such a manner that aligning mark 25 of the object coincides with aligning mark 12 in supporting surface 10. The knobs 21 and 22 ensure a displacement of the object 24 in the directions of the two slides 4 and 5 (see FIG. 2). The arm 18 of the micromanipulator is moved in its longitudinal direction or in a direction at right angles thereto. The holder 19 then does not turn. The extremely important angular adjustment of aligning mark 25 relative to aligning mark 12 is obtained by operating knob 23. The holder 19 secured to arm 18 and rotatable about a point of rotation 26 acquires an angular displacement since a rod 27 can be displaced in the direction shown by a double arrow. Rod 27 is coupled to the micromanipulator in such a manner that it does not cause an angular displacement of holder 19 upon adjusting with the aid of the knobs 21 and 22.

When the aligning marks 12 and 25 are accurately made to coincide the vacuum in conduit 20 is released. The object 24 is then held in the aligned position against supporting surface 10 with the aid of the slight vacuum in the ducts 13. If an object 24 is successively aligned above each of the six apertures 11 in the supporting surface, the micromanipulator and the microscope are swiveled upwards and an exposure head is placed on the supporting surface. Subsequently the patterns of the object 24 are reproduced in a repeating and reduced manner on the plates of photographic material which are provided on the supports 7 so that these plates may serve, after development, as photomasks in the manufacture of integrated circuits. These plates may then have, for example, 20 rows of 20 singlefold patterns which are located at accurately spaced distance from one another and are all in the desired angular position. The aligning marks 12 are provided on the supporting surface 10 in such a manner that in the starting position of the slides 4 and 5 the image of object 24 of the plates of photographic material lying on supports 7 are both in the desired position and in the desired angular position.

Figure 4:
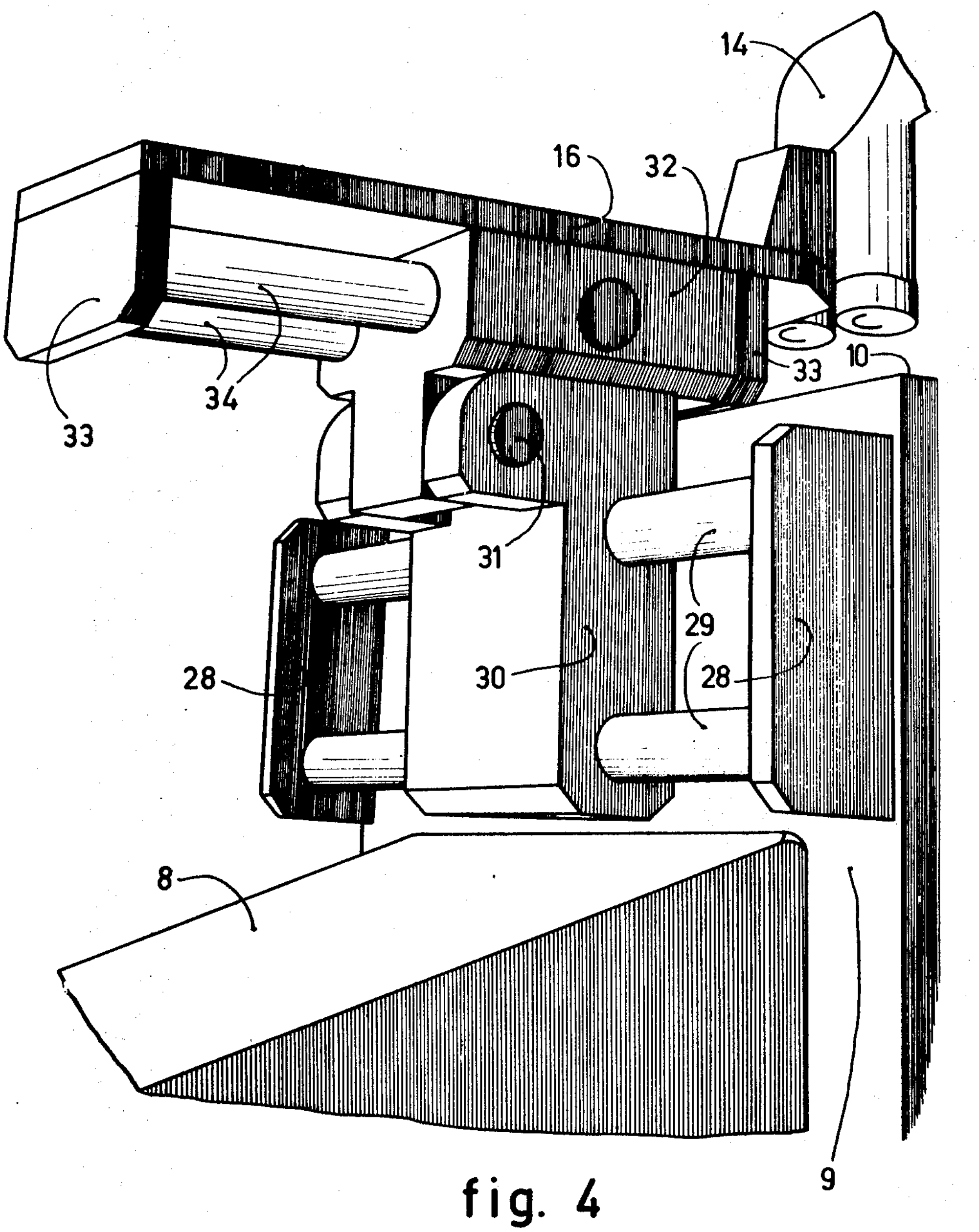
FIG. 4 is a perspective elevational view of the guiding means of the microscope and the micromanipulator.

FIG. 4 shows a guide for positioning the combination of microscope and micromanipulator above the aligning areas. Two supporting plates 28 are provided on one side of housing 9. Two guide rods 29 upon which a block 30 can slide are provided between these supporting plates. A shaft 31 is provided in block 30 to which shaft a guide body 32 is pivotally secured. Two guide rods 34 are coupled with the aid of supports 33 to the supporting arm 16 to which the microscope and the micromanipulator are rigidly secured. These guide rods can be moved in bores of the guide body 32. The micromanipulator is not visible in FIG. 4.

In the position shown the microscope and the micromanipulator are located above the supporting surface 10 of the step and repeat camera (see also FIG. 1). They may be brought to a desired aligning position by moving supporting arm 16 relative to guide body 32 and by moving block 30 relative to the rods 29. Since the adjustment of the microscope and the micromanipulator in the aligning positions is not critical, no stringent requirements need be imposed on the accuracy of the guides. If an exposure head is to be placed on the step and repeat camera, supporting arm 16 and the microscope and micromanipulator connected thereto are swiveled about shaft 31 so that the upper side of the step and repeat camera is entirely free. This position is shown in FIG. 2. The construction shown thus permits of rapid and uncomplicated operation.

The drawing shows an embodiment of the step and repeat camera according to the invention. It will be evident that modifications of a number of structural details are possible without passing beyond the scope of the invention. It will also be evident that the step and repeat camera according to the invention need not be constructed in a six-fold manner. Other embodiments such as a singlefold construction are alternatively possible.

What is claimed is:

1. A step and repeat camera for reducing and reproducing in a repeating manner at least one object having the desired pattern on at least one plate of photographic material comprising a base, a table slidably mounted on said base for supporting said plate of photographic material, said plate having successively different areas exposed to the camera, a housing located substantially above said table having a surface for supporting thereon said object, means slidably mounted on said base for supporting said surface, at least one aperture on said surface over which said object is arranged, means within said housing for projecting the pattern of said object through said aperture onto said plate, means for aligning said object over said aperture comprising a first aligning mark on said object and a second aligning mark on said surface, means movably mounted above said surface for moving and orienting said object with respect to said aperture so as to cause said aligning marks to coincide, and a microscope movable with said orienting means for accurately observing the movement of said object so as to precisely align said aligning marks.

2. The camera according to claim 2 wherein said microscope comprises a pair of lenses arranged in side-by-side relation for simultaneous observation of two locations on said aligning marks during orientation.

3. The camera according to claim 3 further comprising guide means mounted on a side of said housing, a guide block slidably mounted on said guide means for movement in a direction parallel to said surface, a body pivotally connected to said guide block for pivotal movement thereof about an axis parallel to the direction of movement of said guide block, an arm for rigidly supporting therefrom said object orienting means and said microscope movably mounted on said body for movement in a direction perpendicular to the direction of movement of said guide block so that said object may be displaced in either of said directions for orientation.

4. The camera according to claim 3 further comprising means associated with said arm for angularly positioning said object.